(12) United States Patent
Townsend

(10) Patent No.: US 10,509,108 B2
(45) Date of Patent: Dec. 17, 2019

(54) OPTICAL LENS HAVING A HIGH REFRACTIVE INDEX FOR ROBUSTNESS TO LIQUID IMMERSION

(71) Applicant: STMICROELECTRONICS (RESEARCH & DEVELOPMENT) LIMITED, Marlow (GB)

(72) Inventor: Christopher Townsend, Edinburgh (GB)

(73) Assignee: STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 352 days.

(21) Appl. No.: 15/378,619

(22) Filed: Dec. 14, 2016

(65) Prior Publication Data
US 2018/0164411 A1 Jun. 14, 2018

(51) Int. Cl.
| | | |
|---|---|---|
| *G01S 7/481* | (2006.01) | |
| *G02B 27/09* | (2006.01) | |
| *G01S 17/08* | (2006.01) | |
| *G01S 7/497* | (2006.01) | |
| *G02B 27/42* | (2006.01) | |

(52) U.S. Cl.
CPC .......... *G01S 7/4814* (2013.01); *G01S 7/4813* (2013.01); *G01S 7/4816* (2013.01); *G01S 7/497* (2013.01); *G01S 17/08* (2013.01); *G02B 27/0944* (2013.01); *G02B 27/425* (2013.01)

(58) Field of Classification Search
CPC .... G01S 7/4811; G01S 7/4813; G01S 7/4814; G01S 7/4816; G02B 27/0944; B63G 8/38
See application file for complete search history.

(56) References Cited

U.S. PATENT DOCUMENTS

| | | | | |
|---|---|---|---|---|
| 4,346,966 A * | 8/1982 | Nakamura | ............. | G02B 13/00 359/648 |
| 4,948,258 A * | 8/1990 | Caimi | ................. | G01B 11/2441 356/3.13 |
| 6,304,289 B1 * | 10/2001 | Sakai | ...................... | B63C 11/42 348/81 |
| 6,452,179 B1 * | 9/2002 | Coates | .................... | G01J 3/443 250/339.09 |
| 2005/0024876 A1 * | 2/2005 | Oppenheimer | ......... | F21V 31/00 362/267 |
| 2012/0062963 A1 * | 3/2012 | Gillham | .................. | B63C 11/48 358/474 |
| 2015/0301180 A1 * | 10/2015 | Stettner | ................. | G01S 17/107 356/5.01 |
| 2016/0218236 A1 * | 7/2016 | Dhulla | .................. | H01L 31/107 |
| 2018/0052235 A1 * | 2/2018 | Tall | ......................... | G01S 17/89 |

* cited by examiner

*Primary Examiner* — Eric L Bolda
(74) *Attorney, Agent, or Firm* — Seed IP Law Group LLP

(57) ABSTRACT

Various embodiments provide an optical element having a high or large refractive index. The optical element is able to maintain its beam shaping function or output when it is immersed in air or water. Accordingly, the optical element may be used for a variety of different devices or applications, including optical telecommunication devices, cameras, tablets, computers, mobile telephones, and optical sensors, that may be immersed in multiple environments, such as air or water.

18 Claims, 3 Drawing Sheets

OPTICAL LENS HAVING A HIGH REFRACTIVE INDEX FOR ROBUSTNESS TO LIQUID IMMERSION

BACKGROUND

Technical Field

The present disclosure is directed to an optical device tolerant to liquid immersion.

Description of the Related Art

Optical beam shapers, either refractive or diffractive in design, are used to shape light in such a way as to generate a desired output, often with a uniform intensity distribution, although various spatial patterns are possible. An optical element of this type, for example, may be used to alter and split a single beam of light that propagates through it into several beams. A beam shaper is typically made of a single material and includes microstructures patterned directly into a surface of the material. The dimensions (i.e., height and width) of the microstructures may be customized to have a desired shaping function or output.

In general, the refractive index of a material determines the amount a light signal (i.e., light ray) will diffract or bend when propagating through the material. When the refractive index of the material is approximately equal to the refractive index of an environment immersing the material, a light signal propagating through the material will not diffract or bend. Accordingly, a shaping function or output of a beam shaper is highly dependent on having a difference between a refractive index of the material used to form the beam shaping structure and a refractive index of the environment immersing the beam shaper optic. If the refractive indices of the beam shaper optic and the immersing environment are approximately equal to each other, the beam shaper optic will lose its shaping function or output. For example, current beam shaper optics, which are commonly made of transparent polymers having a refractive index of about 1.5, often lose most of their shaping function when immersed in water, which has a refractive index of about 1.3. This is problematic for electronic devices having beam shaper optic that are used outdoors and exposed to water or rain.

BRIEF SUMMARY

The present disclosure is directed to a beam shaper optic that is made of a made of a material having a high or large refractive index (i.e., greater than 2). Using a material having a high refractive index for the beam shaper optic ensures that there is a large difference between the refractive indices of the beam shaper optic and water. As a result, the beam shaper optic is able to maintain its shaping function or output even when it is immersed water. Accordingly, the beam shaper optic may be utilized in a variety of different applications in which the beam shaper optic will be exposed to water.

According to one embodiment, beam shaper optics as disclosed herein are used in a time-of-flight sensor. The time-of-flight sensor determines a distance between the time-of-flight sensor and an object. The time-of-flight sensor includes a substrate, a cap, a light source, a die, a receiving optical lens, and a transmitting beam shaper optic.

The receiving optical lens and the transmitting beam shaper optic include microstructures that modulate light by refraction or diffraction. The receiving optical lens and the transmitting beam shaper optic are made of a material having a high or large refractive index. In one embodiment, the receiving optical lens and the transmitting beam shaper optic are made of a material having a refractive index greater than 2. In another embodiment, the receiving optical lens and the transmitting beam shaper optic are made of a material having a refractive index greater than 3.

In the time-of-flight sensor the light source and the die are positioned on the substrate and are covered by a cap. The light source underlies the transmitting beam shaper optic, and emits a light signal, such as an optical pulse, through the transmitting beam shaper optic. The die includes a target sensor array and a reference sensor array. The target sensor array measures light signals transmitted through the receiving optical lens. The reference sensor array measures light signals that are transmitted by the light source and reflected back from the transmitting beam shaper optic. The receiving optical lens and the transmitting beam shaper optic overlie the target sensor array and the light source, respectively.

DETAILED DESCRIPTION

Figure 1:
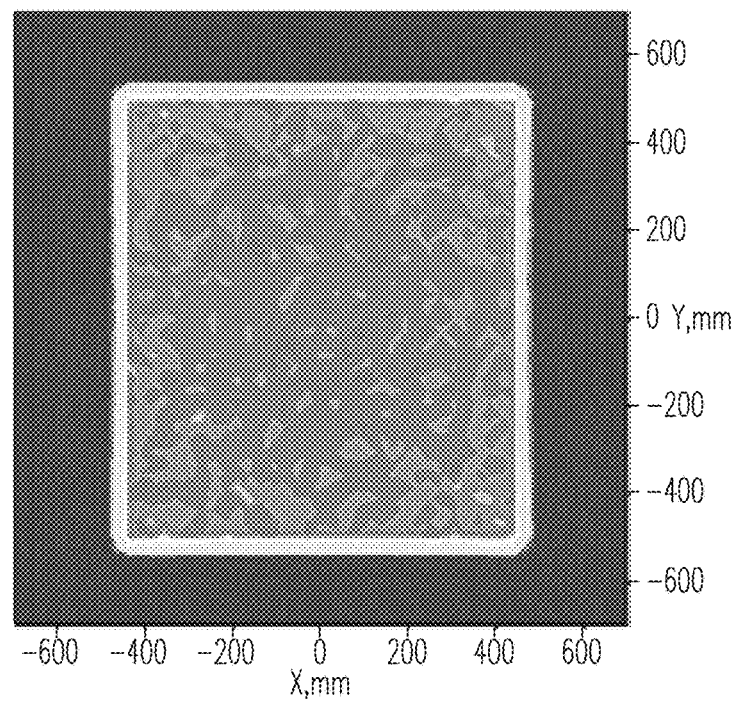
FIG. 1 is an optimal output pattern of a beam shaper optic according to one embodiment disclosed herein.

In the following description, certain specific details are set forth in order to provide a thorough understanding of various embodiments of the disclosure. However, one skilled in the art will understand that the disclosure may be practiced without these specific details. In some instances, well-known details associated with semiconductors, integrated circuits, optical lenses, and time-of-flight sensors have not been described to avoid obscuring the descriptions of the embodiments of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

The present disclosure is directed to a method of selection and forming of an optical device that is robust to immersion in a liquid, such as water. That is, the device will continue to operate or function, i.e. will continue to transmit and receive a specific light signal in a variety of environments, including air and water. The method includes selecting a material having a refractive index that is sufficient enough to counteract the impact of submerging the device in water. The device will be configured to be used in a first environment, such as air, and in a second environment, such as under water.

As previously discussed, the refractive index of a material determines the amount a light signal diffracts or bends when propagating through the material. When the refractive index of a material is approximately equal to the refractive index of the environment in which the material is positioned, a light signal propagating through the material does not diffract or bend. Thus, a shaping function of a beam shaper optic is highly dependent on having a difference between a refractive index of the beam shaper optic and a refractive index of an environment in which the beam shaper optic is positioned. If the refractive indices of the beam shaper optic and the immersing environment are approximately equal to each other, light propagating through the beam shaper optic will not be deviated and the beam shaper optic will lose its shaping function or output.

Figure 4:
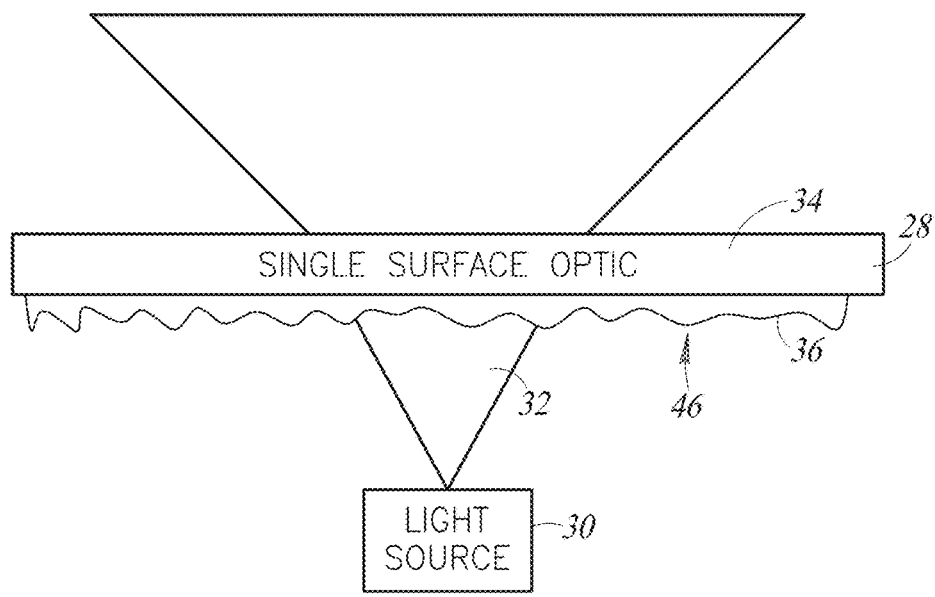
FIG. 4 is an enlarged cross-sectional view of a beam shaper optic according one embodiment disclosed herein.

A device formed in accordance with this disclosure will include a lens 28 to be used with a light source 30, where the lens 28 impacts the light emitted from the light source (see FIG. 4). The lens 28 may be included as a diffuser such that an optimal output pattern of the light source through the lens is illustrated in FIG. 1 for a standard environment. If this device is included in a cell phone in conjunction with a camera, the standard environment would be the lens exposed to air (indoor or outdoor, with no water on the lens). The lens is also configured to maintain consistent operation in an atypical environment, such as in the rain or when submerged in water. A refractive index of the lens is selected to maintain consistent operation in a variety of environments.

The output pattern of FIG. 1 represents the desired shaping function or output of the beam shaper optic. As shown in FIG. 1, the beam shaper optic provides an output pattern that distributes light approximately evenly. The beam shaper optic used to generate the output pattern of FIG. 1 has a refractive index approximately equal to 1.5. The difference between the refractive index of the lens and air is sufficient to achieve the output pattern of FIG. 1.

Figure 2:
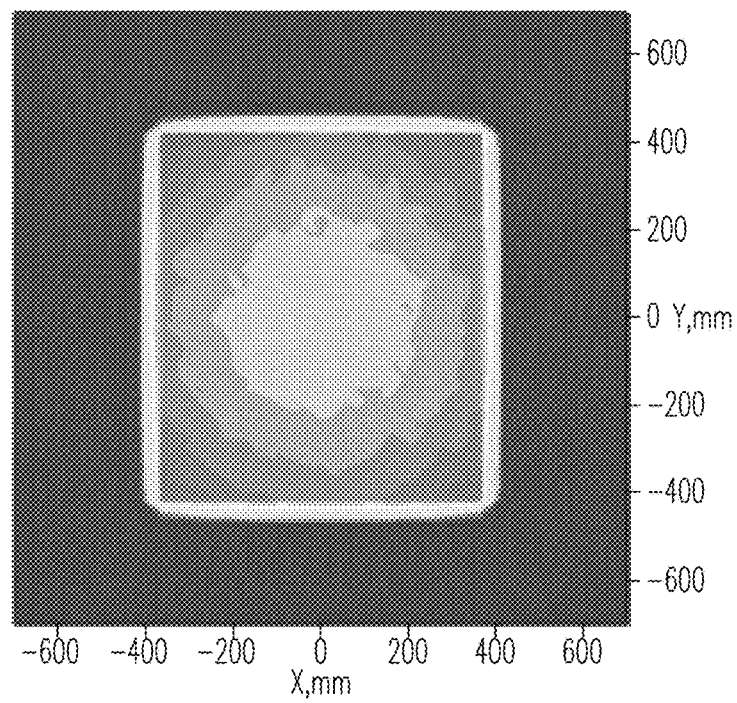
FIG. 2 is an output pattern of the beam shaper optic of FIG. 1 when immersed in water according to one embodiment disclosed herein.

FIG. 2 is an output pattern of the beam shaper optic of FIG. 1 when immersed in water according to one embodiment. This output pattern may result with submersion of the device in water or with water on the lens, such as in the rain. This output pattern is undesirable. As a result of water having a refractive index of approximately 1.3, there is no longer a large difference between the refractive index of the beam shaper optic and a refractive index of an environment immersing the beam shaper optic. Consequently, as shown in FIG. 2, the beam shaper optic loses its shaping function or output. Namely, the beam shaper optic no longer provides an output pattern that distributes light approximately evenly. Rather, light is heavily concentrated in the center of the output pattern. This affects the devices ability to function properly. Having consistent performance in a variety of environments allows the device to perform accurately despite the environmental conditions.

Various embodiments described herein provide a beam shaper optic that is made of material having a high or large refractive index (i.e., greater than 2). As will be discussed in further detail below, by using a material having a high refractive index, the difference between the refractive index of the beam shaper optic and a refractive index of an environment immersing the optical lens remains large, whether the beam shaper optic is immersed in air or water. As a result, the beam shaper optic is able to maintain its shaping function in either air or water, and, thus, may be used for a variety of different applications in which the beam shaper optic will be exposed to water, including optical telecommunication devices, cameras, tablets, computers, mobile telephones, and optical sensors.

This is particularly useful for beam shaper optics used in conjunction with light sources that may cause eye damage, such as lasers. Beam shaper optics in such applications often shape light to be safe for a user's eyes by, for example, diffusing (i.e., defocusing) light. Having a beam shaper optic that is robust to immersion in liquid, such as water, ensures that its shaping function is not drastically modified when immersed to a point where light transmitted from the beam shaper optic is no longer safe for a user to view. Accordingly, eye safety may be ensured whether the beam shaper optic is immersed in air or water.

Figure 3:
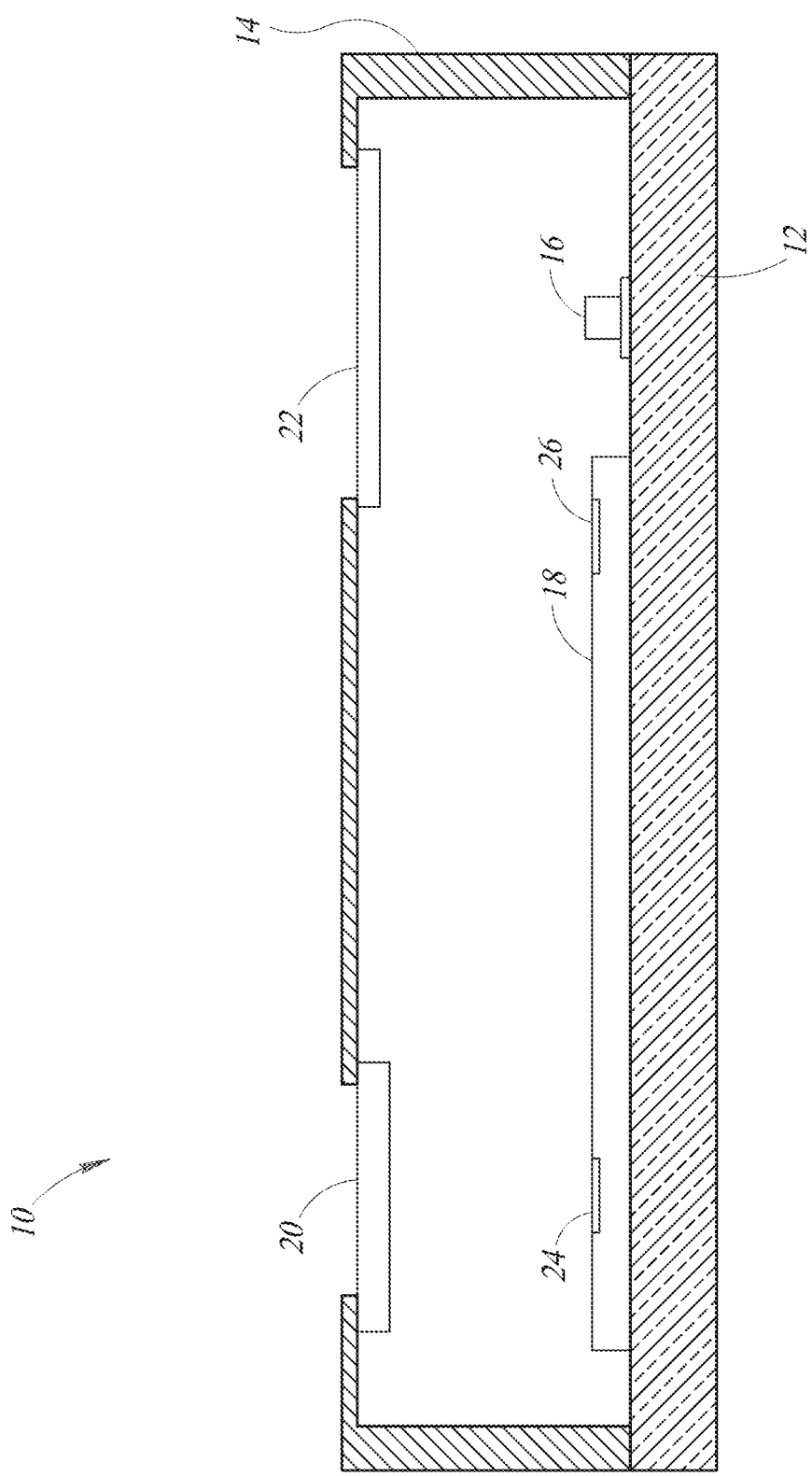
FIG. 3 is a cross-sectional view of a time-of-flight sensor that includes optical lenses according to one embodiment disclosed herein.

FIG. 3 is a cross-sectional view of a time-of-flight sensor 10 that includes beam shaper optics according to one embodiment. The time-of-flight sensor 10 includes a substrate 12, a cap 14, a light source 16, a light receiving and processing die 18, a receiving lens 20, and a transmitting beam shaper optic 22. A combination of the substrate 12 and the cap 14 forms an enclosure or package that contains the light source and the die.

This time-of-flight sensor may be included in a variety of electronic devices, including hand-held electronic devices like a mobile phone or tablet. The time-of-flight sensor may be incorporated with a camera and used for flash adjustment or other distance measurements beneficial to the camera. As such, the lens selected according to the present disclosure will allow the time-of-flight sensor to operate in a first environment having a first refractive index, such as standing outside at park and in a plurality of second environments having second refractive indexes, such as in the rain or in a swimming pool. The refractive index of the lens is greater than the first and second indices. This allows the time-of-flight sensor to maintain optimal performance regardless of the environment in which the time-of-flight sensor is used. This gives the user ultimate flexibility in how to use their device.

The time-of-flight sensor includes the light source 16 and the die 18 that are positioned on the substrate 12 and are covered by a cap 14. The substrate 12 and the cap 14 house the light source 16 and the die 18 to protect them from an external environment, which has a varying refractive index. In one embodiment, the substrate 12 and the cap 14, together, provide a water-resistant or waterproof housing.

The light source 16 underlies the transmitting beam shaper optic 22. When in use the light source emits a light signal, such as an optical pulse, through the transmitting beam shaper optic 22. In one embodiment, the light source 16 is an infrared or near infrared light source, such as a vertical-cavity surface-emitting laser (VCSEL).

The die 18 includes a target sensor array 24 and a reference sensor array 26. The target sensor array 24 and the reference sensor array 26 each include a plurality of photodetectors that sense or measure a light signal. The target sensor array 24 measures light signals transmitted through the receiving lens 20. The reference sensor array 26 measures light signals that are transmitted by the light source 16 and reflected back from the transmitting beam shaper optic 22. The target sensor array 24 and the reference sensor array 26 may be any type of sensors that measure light signals. In one embodiment, the target sensor array 24 and the reference sensor array 26 are single-photon avalanche diode (SPAD) arrays.

The receiving lens 20 and the transmitting beam shaper optic 22 overlie the target sensor array 24 and the light source 16, respectively. The receiving lens 20 and the transmitting beam shaper optic 22 include a plurality of microstructures that modulate light. For example, the receiving lens 20 and the transmitting beam shaper optic 22 may both function as bandpass filters such that light with a desired wavelength transmits a specific frequency of light. In one embodiment, the receiving lens 20 and the transmitting beam shaper optic 22 function as bandpass filters that transmit infrared light. In one embodiment, the transmitting beam shaper optic 22 has a shaping function to diffuse light to a level that is safe for a user's eyes.

The time-of-flight sensor 10 determines a distance between the time-of-flight sensor 10 and an object. The light source 16 transmits a light signal through the transmitting beam shaper optic 22 into an external environment. The target sensor array 24 measures light that hit an object in the external environment and is reflected back through the receiving lens 20. The reference sensor array 26 measures light that is reflected back from the transmitting beam shaper optic 22. The time-of-flight sensor 10 uses the light detected by the target sensor array 24 and the reference sensor array 26 to determine the time of flight of the light signal to travel from the light source 16 to the object and back to the target sensor array 24. A distance between the time-of-flight sensor 10 and the object is determined based on the time of flight.

If the lens is not configured to operate in multiple environments having different refractive indexes, then the reflected light detected will not be consistent in the different environments and thus the distance determined will not be accurate in all use cases. The lens will lose some of its properties when in the different environments if the refractive index of the lens is too close to the refractive index of the environment.

The receiving lens 20 and the transmitting beam shaper optic 22 are made of a material having a high or large refractive index as compared to air. In one embodiment, the receiving lens 20 and the transmitting beam shaper optic 22 are made of a material having a refractive index greater than 2. In one embodiment, the receiving lens 20 and the transmitting beam shaper optic 22 are made of a material having a refractive index greater than 3. In one embodiment, the receiving lens 20 and the transmitting beam shaper optic 22 are made of a material having a refractive index that is greater than the refractive index of air and/or water by at least 0.5. In one embodiment, the receiving lens 20 and the transmitting beam shaper optic 22 are made of a material having a refractive index that is greater than the refractive index of air and/or water by at least 1.

As previously discussed, a shaping function of a beam shaper optic is highly dependent on having a difference between a refractive index of the beam shaper optic and a refractive index of an environment immersing the beam shaper optic. Light propagating through a beam shaper optic will not deviate when the refractive indices of the beam shaper optic and the immersing environment are approximately equal to each other. Using a material having a high refractive index for the receiving lens 20 and the transmitting beam shaper optic 22 ensures that there will be a large difference between the refractive index of the beam shaper optic and the refractive index of air and water. For example, if a beam shaper optic has a refractive index of 2 and is immersed in air, which has a refractive index approximately equal to 1, the difference between the refractive indexes is approximately 1. If the optical lens has a refractive index of 2 and is immersed in water, which has a refractive index of approximately 1.3, the difference between the refractive indexes is approximately 0.7. Thus, the beam shaper optic is able to maintain its shaping function or output whether it is immersed in either air or water. Accordingly, the time-of-flight sensor 10 is capable of functioning as intended whether it is exposed to or immersed in air or water.

In one embodiment, the receiving lens 20 and the transmitting beam shaper optic 22 are each made of a single material (i.e., monolithic). The receiving lens 20 and the transmitting beam shaper optic 22 may be made of one of the following: Zinc Sulphide (ZnS), Galium Nitride (GaN), Zinc Selenide (ZnSe), Titanium Dioxide (TiO2), Silicon Carbide (SiC), Gallium Phosphide (GaP), Gallium Arsenide (GaAs), and Hydrogenated Silicon (Si:H).

In one embodiment, the receiving lens 20 and the transmitting beam shaper optic 22 are made of the same material. In another embodiment, the receiving lens 20 is made of a first material and the transmitting beam shaper optic 22 is made of a second material that is different from the first material.

The lenses of this disclosure may include an active surface that has microstructure features formed from the materials listed above. This active surface along with the selected material contributes to the refractive index of the lens.

FIG. 4 is an enlarged cross-sectional view of a beam shaper optic 28, such as the receiving lens 20 and the transmitting beam shaper optic 22, according one embodiment. A light source 30 emits a light signal 32 through the beam shaper optic 28. As previously discussed with respect to FIG. 3, the beam shaper optic 28 may be used in a time-of-flight sensor, and the light source 30 may be an infrared light source, such as a VCSEL.

The beam shaper optic 28 includes a substrate 34 and a plurality of microstructures 36 on the substrate 34. The microstructures 36 are configured to modulate the light signal 32 emitted by the light source 30 by refraction or diffraction. The microstructures 36 may have various heights and widths and may be customized for a specific shaping function or output. For example, the microstructures 36 may be adapted for beam shaping or altering the phase and magnitude of light propagating through the beam shaper optic 28.

Figure 5:
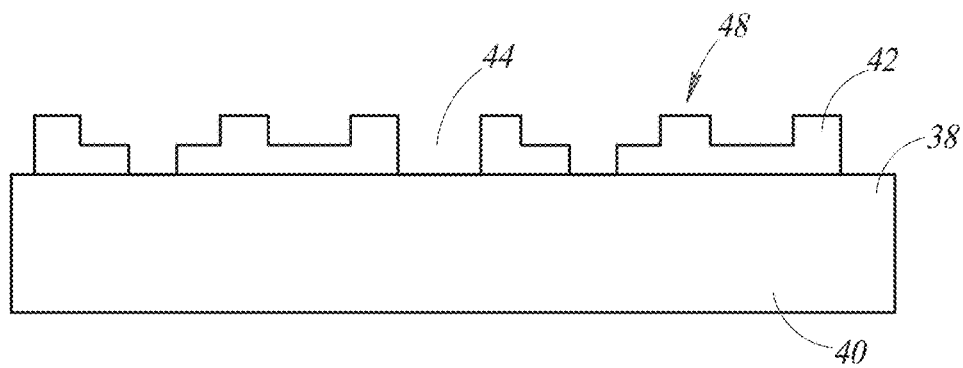
FIG. 5 is an enlarged cross-sectional view of a beam shaper optic according to another embodiment disclosed herein.

In one embodiment, as shown in FIG. 4, the microstructures 36 are coupled to each other. In another embodiment, one or more of the microstructures 36 are spaced from each other. For example, FIG. 5 is an enlarged cross-sectional view of a beam shaper optic 38 according to another embodiment. The beam shaper optic 38 includes a substrate 40 and a plurality of microstructures 42 on the substrate 40. One or more of the diffractive microstructures 42 are separated from each other by a space or gap 44 that exposes the substrate 40.

In one embodiment, as shown in FIG. 4, the microstructures 36 have rounded surfaces 46. In another embodiment, the microstructures 36 have planar surfaces. For example, referring to FIG. 5, the microstructures 42 each have a planar surface 48.

The microstructures, such as the microstructures 36 and 42, may be fabricated using a variety of semiconductor processing techniques. In one embodiment, the beam shaper optic 28 is fabricated as a single layer. For example, the beam shaper optic 28 may be fabricated using injection molding. Alternatively, a single thick layer is formed and etched using a plurality of masks to form the different microstructures. In another embodiment, the microstructures are formed from a plurality of layers that are formed and etched consecutively. Namely, the microstructures are fabricated by forming a plurality of layers in sequence using standard semiconductor manufacturing tools, and removing portions of each layer after each layer is formed.

In accordance with one or more embodiments, the beam shaper optic disclosed herein has a high or large refractive index (i.e., greater than 2). The beam shaper optic is able to maintain its diffractive function or output when it is immersed in air or water. Accordingly, the beam shaper optic may be used in a variety of different devices, including optical telecommunication devices, cameras, tablets, computers, mobile telephones, and optical sensors, that are exposed to or immersed in a variety of different environments, such as air or water.

The present disclosure describes a device that includes a package having a first opening, and a first beam shaper optic coupled to the package and covering the first opening. The first beam shaper optic is configured to operate in a first environment having a first refractive index and in a second environment having a second refractive index. The first refractive index is smaller than the second refractive index. The lens has a third refractive index that is greater than the second refractive index. The device also includes a light source in the package and aligned with the first beam shaper optic.

The present disclosure also describes a method that includes determining a first refractive index of a first environment of operation for an optical device having a lens, and determining a second refractive index of a second environment of operation. The first refractive index is different from the second refractive index. The method also includes determining a third refractive index of the lens based on the first and second refractive indexes. The third refractive index is greater than the first refractive index.

The present disclosure also describes a device that includes a light source, a single-photon avalanche diode sensor array, and an optical lens having a plurality of microstructures. The optical lens overlies the light source, and the optical lens has a refractive index greater than 2.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a package having a first opening;
a first beam shaper optic coupled to the package and covering the first opening, the first beam shaper optic configured to operate in a first environment having a first refractive index and in a second environment having a second refractive index, the first refractive index being smaller than the second refractive index, the first beam shaper optic having a third refractive index that is greater than the second refractive index, the third refractive index being greater than 2; and
a light source in the package and aligned with the first beam shaper optic.

2. The device of claim 1, wherein the package includes a second opening, the device further including:
a second beam shaper optic coupled to the package and covering the second opening; and
a sensor array in the package and aligned with the second beam shaper optic.

3. The device of claim 2 wherein the second beam shaper optic has a fourth refractive index, the third refractive index being different from the fourth refractive index.

4. The device of claim 1 wherein the third refractive index is greater than 3.

5. The device of claim 1 wherein the first beam shaper optic includes one from among Zinc Sulphide (ZnS), Gallium Nitride (GaN), Zinc Selenide (ZnSe), Titanium Dioxide (TiO2), Silicon Carbide (SiC), Gallium Phosphide (GaP), Gallium Arsenide (GaAs), and Hydrogenated Silicon (Si:H).

6. The device of claim 1 wherein a difference between the first refractive index and the third refractive index is greater than one.

7. The device of claim 1 wherein a difference between the second refractive index and the third refractive index is greater than one.

8. A device, comprising:
a light source;
a single-photon avalanche diode sensor array; and
an optical lens having a plurality of diffractive microstructures, the optical lens overlying the light source, the optical lens having a refractive index greater than 2.

9. The device of claim 8 wherein the light source is an infrared light source.

10. The device of claim 8 wherein the optical lens includes one from among Zinc Sulphide (ZnS), Gallium Nitride (GaN), Zinc Selenide (ZnSe), Titanium Dioxide (TiO2), Silicon Carbide (SiC), Gallium Phosphide (GaP), Gallium Arsenide (GaAs), and Hydrogenated Silicon (Si:H).

11. The device of claim 8 wherein the optical lens has a refractive index greater than 3.

12. The device of claim 8 wherein the device is a time-of-flight sensor.

13. A device, comprising:
a package having a first opening;
a first beam shaper optic coupled to the package and covering the first opening, the first beam shaper optic configured to operate in a first environment having a first refractive index and in a second environment having a second refractive index, the first refractive index being smaller than the second refractive index, the first beam shaper optic having a third refractive index that is greater than the second refractive index, the first beam shaper optic including one from among Zinc Sulphide (ZnS), Gallium Nitride (GaN), Zinc Selenide (ZnSe), Titanium Dioxide (TiO2), Silicon Carbide (SiC), Gallium Phosphide (GaP), Gallium Arsenide (GaAs), and Hydrogenated Silicon (Si:H); and
a light source in the package and aligned with the first beam shaper optic.

14. The device of claim 13 wherein the third refractive index is greater than 2.

15. A device, comprising:
a package having a first opening;
a first beam shaper optic coupled to the package and covering the first opening, the first beam shaper optic configured to operate in a first environment having a first refractive index and in a second environment having a second refractive index, the first refractive index being smaller than the second refractive index, the first beam shaper optic having a third refractive index that is greater than the second refractive index, a difference between the first refractive index and the third refractive index being greater than one; and
a light source in the package and aligned with the first beam shaper optic.

16. The device of claim 15 wherein the third refractive index is greater than 2.

17. A device, comprising:
- a package having a first opening;
- a first beam shaper optic coupled to the package and covering the first opening, the first beam shaper optic configured to operate in a first environment having a first refractive index and in a second environment having a second refractive index, the first refractive index being smaller than the second refractive index, the first beam shaper optic having a third refractive index that is greater than the second refractive index, a difference between the second refractive index and the third refractive index being greater than one; and
- a light source in the package and aligned with the first beam shaper optic.

18. The device of claim 17 wherein the third refractive index is greater than 2.

\* \* \* \* \*